United States Patent [19]

Schaupp

[11] Patent Number: 4,824,082
[45] Date of Patent: Apr. 25, 1989

[54] MECHANICAL SUPPORT FOR FAILED GAS STRUTS AND METHOD

[76] Inventor: Edward R. Schaupp, 2120 N. Yosemite St., Stockton, Calif. 95204

[21] Appl. No.: 164,879

[22] Filed: Mar. 8, 1988

[51] Int. Cl.⁴ ............................ F16F 5/00; F16F 9/32
[52] U.S. Cl. ..................................... 267/120; 188/300; 188/321.11; 267/64.12; 296/76; 292/338
[58] Field of Search ............... 16/336, 66, 84; 267/64.12, 120, 66–68; 188/300, 67, 265, 321.11, 322.11, 322.12; 296/56, 76; 292/339, 338, 265, 266, 268, 269, 272, 278; 403/378, 104; 92/18

[56] References Cited

U.S. PATENT DOCUMENTS

| | | | |
|---|---|---|---|
| 3,883,126 | 5/1975 | Nicholls | 267/64.12 |
| 4,070,050 | 1/1978 | Glock et al. | 292/339 |
| 4,078,779 | 3/1978 | Mölders | 267/120 |
| 4,155,433 | 5/1979 | Porter | 188/300 |
| 4,261,446 | 4/1981 | Bolger | 188/322.11 |
| 4,449,702 | 5/1984 | Hasegawa | 267/64.12 |
| 4,557,470 | 12/1985 | Link | 267/64.12 |
| 4,596,383 | 6/1986 | Howard | 267/64.12 |
| 4,634,170 | 1/1987 | Lach | 267/76 |
| 4,723,765 | 2/1988 | Pearson | 188/300 X |
| 4,744,548 | 5/1988 | Hathaway | 188/300 X |

FOREIGN PATENT DOCUMENTS 0014636  2/1981  Japan ............................ 267/64.12

Primary Examiner—Douglas C. Butler
Attorney, Agent, or Firm—Kerkam, Stowell, Kondracki & Clarke

[57] ABSTRACT

An add-on mechanical support assembly is used for supporting failed gas struts or as a safety device in combination with operational gas struts. The support assembly includes a generally tubular support having a slot extending lengthwise. The tubular support has different lengths on different sides. An upper end on a shorter side is used for engaging part of the cylinder of a gas strut in order to block the gas strut from retraction. An upper end of the longer side provides a thumb tab area such that one may push the support out of its blocking position without placing ones hand or fingers in a position where one might be pinched by the retraction of the piston rod of the gas strut to within the gas cylinder. A slotted tab extends downwardly from the bottom of the support and allows a screw to attach a locking block or collar with split ends to the piston rod of the gas strut. Breakaway sections are used on the support to allow adjustment for different lengths.

9 Claims, 2 Drawing Sheets

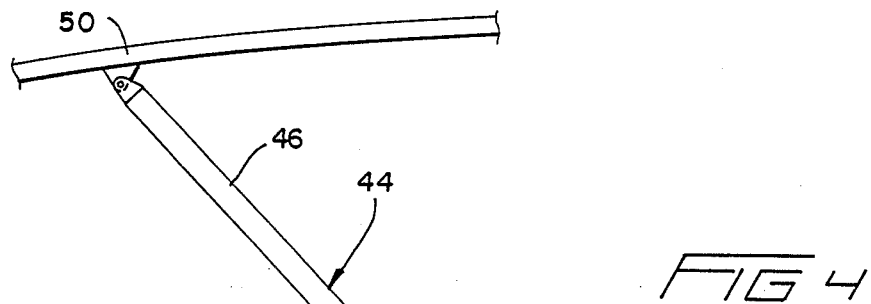
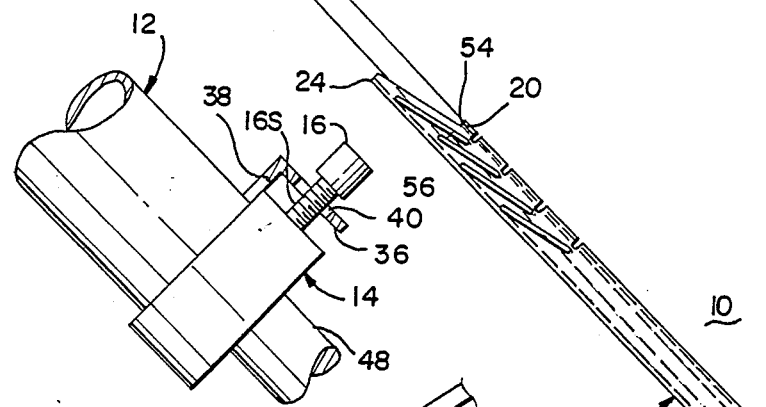
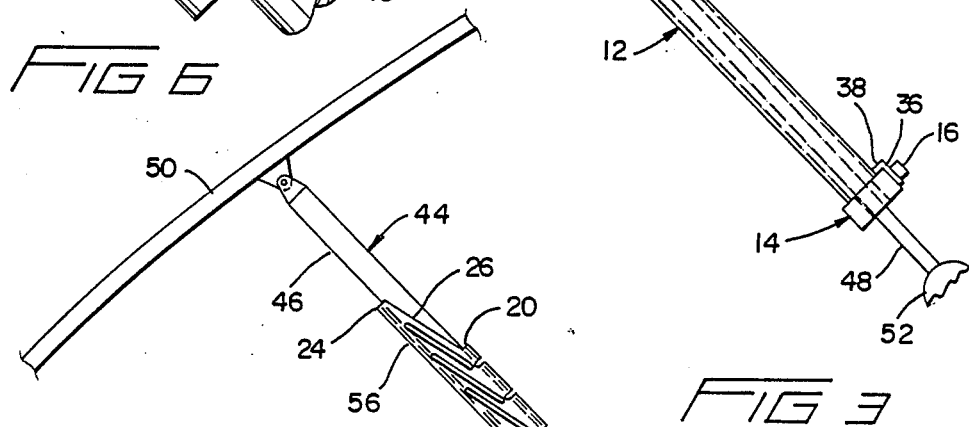
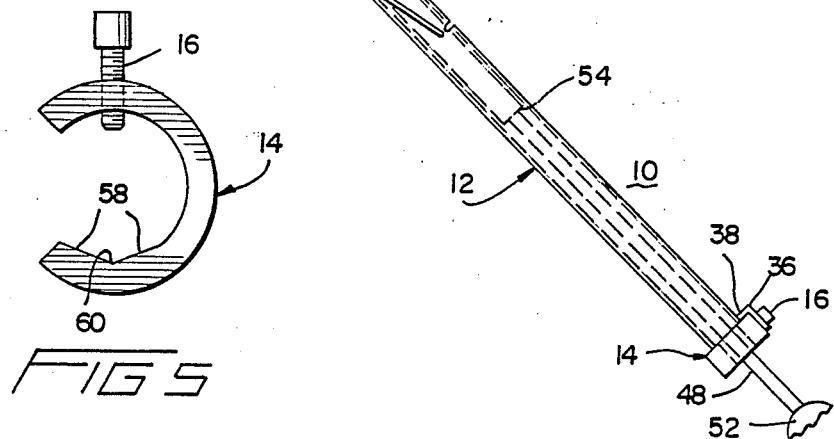
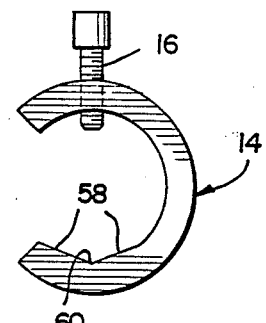

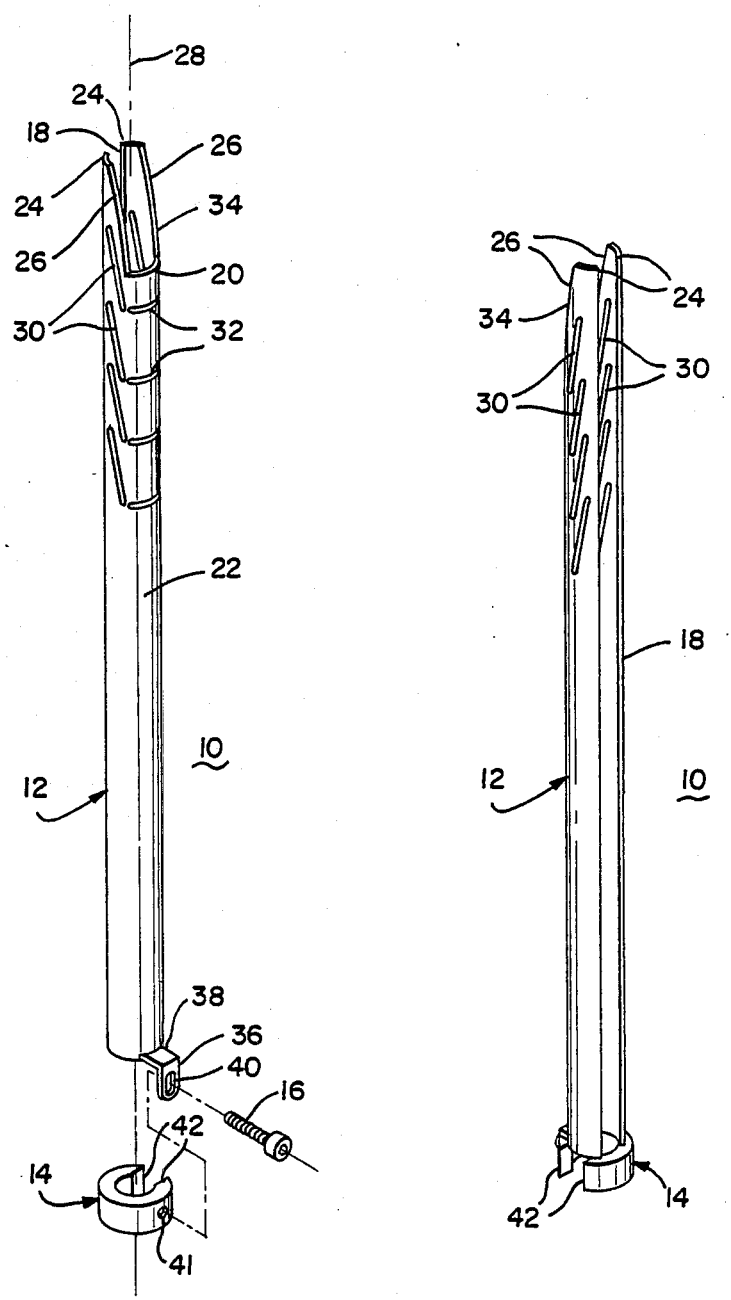

MECHANICAL SUPPORT FOR FAILED GAS STRUTS AND METHOD

BACKGROUND OF THE INVENTION

This invention relates to a mechanical support for failed gas struts and associated method. More specifically, it relates to such a mechanical support which may be easily installed upon a previously existing gas strut.

The use of gas struts has become relatively common. Such struts commonly use a cylinder and a piston rod. A charge of gas is initially placed within the cylinder. Retracting the gas strut from an extended position causes the gas pressure to build up. The gas pressure therefore causes the gas strut to normally assume an extended position.

Such gas struts are often used on the rear doors of hatchback automobiles although they have been used for automobile hoods or numerous other applications. In such hatchback arrangements, the unlocking or unlatching of the hatchback allows the pressurized gas charge to extend the gas strut such that the hatchback is held in an upper open position.

Unfortunately, the gas struts often lose their charge. Depending upon the circumstances, the loss of charge could cause the hatchback to fall down upon a person causing injury. Even in the absence of such danger, the failure of the gas strut makes it very hard for the consumer to continue to use the hatchback for placing items in the rear of his car.

The following U.S. patents are noted:

| Number    | Inventor | Issue Date     |
|-----------|----------|----------------|
| 3,883,126 | Nicholls | May 13, 1975   |
| 4,078,779 | Molders  | March 14, 1978 |
| 4,155,433 | Porter   | May 22, 1979   |
| 4,449,702 | Hasegawa | May 22, 1984   |
| 4,596,383 | Howard   | June 24, 1986  |
| 4,634,170 | Lach     | Jan. 6, 1987   |

The Nicholls patent shows a gas spring having a latching means to prevent it from retracting accidentally.

The Molders patent discloses a pneumatic spring having a manually releasable stop to lock the spring in an intermediate position.

The Porter patent shows a positioning device with a stop which may be used to limit the range of adjustment provided by the positioning device.

The Hasegawa patent discloses a locking device for a gas strut which uses a resilient tubular member.

The Howard patent shows a cylinder which is used to block retraction of the piston rod of a gas spring. The cylinder does not block retraction of the gas spring or strut in the normal fully extended position. However, if the consumer wants to engage the lock, the consumer can extend the gas spring beyond its normal fully extended position such that a mechanical spring pulls the cylinder sideways until it blocks retraction of the gas spring.

The Lach patent discloses a mechanical support for a failed gas strut which may be snap fit to the gas strut or may be magnetically fit to the gas strut. The device includes breakaway sections which can be used to change the length of the device.

Although various prior devices have been generally useful at securing gas struts, they have been subject to one or more of several significant disadvantages. Complexity of construction and relatively high cost limit the applicability of some prior designs. Additionally, many prior designs require that the gas strut be specifically made to include the locking mechanism. That is, many prior designs are not suitable for providing a locking mechanism as an add-on device which can be used in conjunction with numerous of the currently marketed gas struts. Prior designs often have required additional manual manipulation in order to engage the locking mechanism. Some designs require significant time and concentration to perform possibly hazardous manipulations in order to unlock a locking mechanism. Considering that electrical components are sometimes placed at the end of the piston rod on many hatchback doors, it is disadvantageous to transfer thrust in a manner which might interfere with such electrical components as some designs may. Some prior mechanical supports, like that disclosed by the Lach patent, require that the support be completely removed from the gas strut and stored someplace when the gas strut is to be retracted.

OBJECTS AND SUMMARY OF THE INVENTION

Accordingly, it is a primary object of the present invention to provide a new and improved mechanical support for gas struts.

A more specific object of the present invention is to provide a mechanical support which automatically locks upon the gas strut extending and which may be easily unlocked without time consuming or hazardous manipulation.

A still further object of the present invention is to provide a mechanical support which may be added on to a pre-existing gas strut.

Yet another object of the present invention is to provide a mechanical support which transfers longitudinal thrust to the piston rod of the gas strut in order to avoid endangering electrical components at the end of the piston rod base.

The above and other objects of the present invention which will become more apparent as the description proceeds are realized by a support assembly for supporting a gas strut which has a rod at a rod end and a cylinder at a cylinder end. The support assembly comprises: an elongate support having a first length along a first side with a first side cylinder end and a second length along a second side with a second side cylinder end, the second length being longer than the first length; and attachment means on the elongate support and operable for removably securing the elongate support to a rod of a gas strut such that the first side and the second side extend partially along the cylinder of the gas strut when the gas strut is retracted. When the gas strut is moved to an extended position with the second side extending partially along the cylinder, the first side cylinder end is moved by gravity to block the cylinder from retracting. The elongate support is generally tubular such that it fits at least partially around a gas strut. The elongate support has a slot extending along its length, the slot having a sufficient width to allow the gas strut to fit therethrough. The attachment means is a collar having two ends at a split and attachable to a rod end of the elongate support, the split allowing the collar to fit over a gas strut with the split out of line from the slot. The elongate support has an outwardly extending tab at its rod end for attachment to the collar. The second side cylinder end serves as a thumb tab for pushing the support assembly to free the first side cylinder end from the upper cylinder. The elongate support has a plurality of breakaway sections to adjust its length. The support assembly is an add-on unit for a pre-existing gas strut.

The present invention may alternately be described as a support assembly for supporting a gas strut which has a rod and a cylinder, the support assembly comprising: a generally tubular elongate support having a slot extending lengthwise along the entire length of the support; and a collar having two ends at a split removably attachable to the support with the split out of line from the slot such that the support assembly is securable to a gas strut with the gas strut captured inside of the support and the collar. The support assembly is operable by gravity to automatically move into a blocking position to block retraction of the gas strut when it is moved into an extended position. The support is shorter on a first side than on a second side and the slot is disposed on the second side.

The method of the present invention is a method for supporting a gas strut in an extended position, the gas strut having a rod and a cylinder, the steps comprising: removably attaching a support assembly having an attachment means and an elongated support to the gas strut with the elongated support extending along the gas strut and the attachment being made by the attachment means; and extending the gas strut such that gravity causes the elongate support to automatically move into a blocking position wherein the elongate support blocks retraction of the gas strut. The attachment step is accomplished by capturing the gas strut within the support, the support being generally tubular and having a slot therein. The attachment step is more specifically accomplished by placing the support at least partially around the gas strut and by attaching a collar to the gas strut.

A BRIEF DESCRIPTION OF THE DRAWINGS

The above and other features of the present invention will be more readily understood when the following detailed description is considered in conjunction with the accompanying drawings wherein like characters represent like parts throughout the several views and in which:

FIG. 1 shows an exploded perspective view of the support assembly of the present invention.

FIG. 2 shows a perspective view of the support assembly in an assembled condition and than a different angle from that shown in FIG. 1.

FIG. 3 shows the support assembly attached to a gas strut of the hatchback automobile, only small parts of the automobile being shown and the gas strut being partially extended.

FIG. 4 is the same side view as FIG. 3 except that the gas strut has now been fully extended and the support assembly is in a blocking position to block retraction of the gas strut.

FIG. 5 shows an end view of a collar used with the present invention.

FIG. 6 shows an enlarged side view of the collar installed on a gas strut with a tab and offset shown in cross-section.

DETAILED DESCRIPTION

With reference now to FIGS. 1 and 2, the structure of the mechanical support assembly 10 according to the present invention will be discussed in detail. The support assembly 10 includes 3 pieces. An elongate tubular steel support 12, steel base collar 14, and a socket head cup face machine screw (Allen screw) are the three components.

The support 12 is tubular and has an inner diameter sufficient to loosely slide over a gas strut cylinder. A longitudinal slot 18 extends lengthwise along the entire length of the support 12. As best shown in FIG. 1, the support 12 has a first side cylinder end 20 at a first side 22 which has a shorter length than a second side corresponding to the second side cylinder end 24 which is opposite to the first side 22 and corresponds to tee upper tips of the edges of slot 18. (In view of the orientation of the support 12 in FIGS. 1-4, the ends 20 and 24 will be called upper ends opposite a lower end at collar 14.) Two edges 26 extend from the first side upper end 20 to the second side upper ends 24, each of the edges 26 extending at an acute angle of less than 30° relative to the longitudinal axis 28 of the tubular support 12.

A series of slits 30 are disposed below and parallel to the edges 26 and a series of slits 32 are below and parallel to the first side upper end 20. This feature allows a single tubular support 12 to be easily adapted for different lengths of gas struts. In particular, the slits 30 and 32 are joined by small amounts of material such that the end sections may be snapped off with pliers in order to shorten the length of the support 12. By having the slits 30 and 32 respectively correspond to incisive edges 26 and the first side upper end 20, such a shortened support 12 would have an identical configuration to that shown in FIGS. 1 and 2 except that it would have a shorter overall length and fewer of the breakaway sections 34 defined by the slits 30 and 32.

The lower end of the support 12 has a tab 36 mounted on an offset 38 which extends perpendicularly to the axis 28. The tab 36 is parallel to axis 28 and has a slot 40 which allows the screw 16 to attach the locking collar 14 to the support 12 by way of hole 41. The screw 16 preferably extends through the hole 41 and attaches to the piston rod (not shown in FIGS. 1 and 2) of a gas strut such that the collar 14 is fixed to the gas strut. However, the slot 40 and screw 16 are of sufficient length to allow the support 12 to pivot relative to the collar 14. It should be understood that the tab 36 is captured between the locking collar 14 and the head of screw 16. As shown, the collar 14 has two split ends 42 which allow placement of collar 14 over a gas strut in a manner described below. The collar 14 is relatively short (i.e., direction of axis 28) so that it allows full retraction of a gas strut as discussed below.

Continuing to consider the views of FIGS. 1 and 2, but now also focusing on FIGS. 3 and 4, the installation of the support assembly 10 upon a gas strut 44 having an upper cylinder 46 and a lower piston rod 48 will be discussed. The cylinder 46 is secured to a hatchback cover 50; whereas, the piston rod 48 is secured at its lower end 52 in known fashion. 3 and 4, the lower end of the cylinder 46 has a circumferential lip 54 corresponding to its greater diameter than the diameter of the rod 48. The hatchback cover 50 is unlatched (latch not shown) and the gas strut 44 is moved to the fully extended position shown in FIG. 4. The support 12 is placed around the gas strut 44 and moved such that the first upper end 20 of the support 12 is disposed just below the lip 54 defined at the lower end of cylinder 46. The collar 14 is placed around the rod 48 and the screw 16 is threaded into hole 41 with the shaft of screw 16 extending through the slot 40 (refer back to FIG. 1).

(Once one determines the proper position for collar 14, the gas strut 44 can be retracted if desired.) As best shown in FIG. 2, the split between split ends 42 are out of line with the slot 18 of support 12. Therefore, the gas strut 44 is captured within the support 12 and the collar 14. The screw 16 is tightened sufficiently that the collar 14 is secured at a particular position along the length of the rod 48. With reference to FIG. 5, the rod 48 (not shown in FIG. 5) will seat between screw 16 and "V" walls 58 which meet at line 60. As shown in FIGS. 3 and 4, the first side upper end 20 of the support 12 should be disposed at the upper side of gas strut 46; whereas, the second side upper end 24 is disposed below the gas strut 46.

Upon attaching the support assembly 10 in the manner shown in FIG. 4, the support 12 is in a blocking position by virtue of the lip or end 54 of cylinder 46 hitting the first side upper end 20 of the support 12. In order to close the hatchback 50, by retracting the gas strut 44, one may simply push up on the support 12 by touching it immediately below the second side upper ends 24, which portions serve as a thumb tab 56. The cylinder 46 will then be free to telescope in towards the lower end 52 of the rod 48 as shown in FIG. 3 and until a fully closed or fully retracted position is attained. When one wishes to open the hatchback 50, one simply unlatches or unlocks the hatchback cover 50 in the usual manner. Assuming that the gas strut 44 has failed such that the internal gas charge will no longer extend the gas strut 44, the hatchback cover 50 may be manually lifted upward to extend the gas strut 44 until the position of FIG. 4 is again attained. Gravity causes the first side upper end 20 of the support 12 to drop to its blocking position of FIG. 4 as the support 12 is free to hinge relative to the collar 14 by virtue of the length of slot 40 (slot 40 shown in FIG. 1 only) and/or the length of the shaft 16S of screw 16 shown in FIG. 6. As also best understood from FIG. 6, the length of shaft 16S allows free radial movement of the tab 36 and hence the support 12 to avoid bending or damaging tab 36. The slot 40 is sufficiently long that support 12 stresses the collar 14 directly and does not transmit forces (in the FIG. 4 position) to the collar by way of tab 36. The play of tab 36 by virtue of slot 40 avoids overstressing the tab 36 and screw 16 as best shown in FIG. 6. Thus, the support assembly 10 automatically assumes its locking position upon the extension of the failed gas strut 44. Closing of the hatchback cover 50 and returning the gas strut 44 to its retracted position of FIG. 3 simply requires a slight upward push at thumb tab 56 such that lip 54 will clear the upper end 20 of the support 12. Notice also that the cylinder 44 remains at least partially within the support 12 throughout the stroke of the gas strut.

Advantageously, the screw 16 allows one to easily remove the support assembly 10 and move it to a different vehicle if desired.

Although primarily designed as a support for failed gas struts, it will be appreciated that the support assembly 10 could also be used for locking operational gas struts in an upper position. That is, the mechanical support assembly 10 of the present invention could be used as a backup safety device to avoid having a hatchback cover suddenly drop if the gas pressure. within the gas strut is suddenly lost.

As clearly shown in the drawings, the assembly 10 is a springless design such that gravity and not a spring is used to cause lip 54 to drop into the blocking position shown in FIG. 4.

Although the drawings show the assembly 10 installed on a gas strut having an upper cylinder 46 and lower rod 48, the invention will work equally well when the cylinder and rod positions are reversed. The collar 14 could be mounted where the rod end of the strut attaches to the cover and the first side end 20 would be mounted to block an upper part of the cylinder.

Although various specific constructions are disclosed herein, it is to be understood that these are for illustrative purposes only. Various modifications and adaptations will be apparent to those of skill in the art. Accordingly, the present invention should be determined by reference to the claims appended hereto.

What is claimed is:

1. A support assembly for supporting a gas strut which has a rod at a rod end and a cylinder at a cylinder end, the support assembly comprising:
    an elongate support having a first length along a first side with a first side cylinder end and a second length along a second side with a second side cylinder end and said second length being longer that said first length; and attachment means on said elongate support and operable for removably securing said elongate support to a rod of a gas strut such that said first side and said second side extend partially along the cylinder of the gas strut when the gas strut is retracted and such that said first side cylinder end is moved by gravity to contact and block the cylinder from retracting when the gas strut is moved to an extended position with said second side extending partially along the cylinder; and wherein said elongate support is generally tubular such that it fits at least partially around a gas strut and wherein said elongate support has a slot extending along the entire length of the elongate support, said slot having a sufficient width to allow the gas strut rod to fit therethrough and wherein said support is operable such that the cylinder remains at least partially within the support for the full stroke of the gas strut and wherein said support assembly is an add-on for a pre-existing gas strut and wherein said support assembly is springless.

2. The support assembly of claim 1 wherein said attachment means is a collar having two ends at a split and for attachment to a rod end of said elongate support, said split allowing the collar to fit over a gas strut rod with said split out of line from said slot.

3. The support assembly of claim 2 wherein said elongate support has a tab extending at its rod end and for attachment to said collar.

4. The support assembly of claim 3 wherein said second side cylinder end serves as a thumb tab for pushing the support assembly to free the first side cylinder end from the cylinder.

5. The support assembly of claim 1 wherein said elongate support has a plurality of break away sections to adjust its length.

6. The support assembly of claim 1 wherein said slot is on said second side.

7. A method for supporting a gas strut in an extended position by use of the support assembly of claim 1, the gas strut having a rod at a rod end and a cylinder at a cylinder end, the steps comprising:
    removably attaching the support assembly with the elongated support extending along the gas strut and the attachment being made by said attachment means; and extending the gas strut such that gravity causes said elongate support to automatically move into a blocking position wherein said elongate support blocks retraction of the gas strut.

8. The method of claim 7 wherein said attachment step is accomplished by capturing the gas strut within the support.

9. The method of claim 8 wherein said attachment means is a collar and said attachment step is accomplished by placing the support at least partially around the gas strut and attaching the collar to the gas strut rod.

* * * * *